United States Patent Office 2,695,267
Patented Nov. 23, 1954

2,695,267

SEPARATION OF AMINES

Anthony Arthur Leonard Challis, Norton-on-Tees, England, assignor to Imperial Chemical Industries Limited, a corporation of Great Britain No Drawing. Application July 31, 1951,
Serial No. 239,627

Claims priority, application Great Britain August 4, 1950

7 Claims. (Cl. 202—42)

This invention relates to the separation of amines.

In certain processes for the production of amines, for example by the amination of alcohols, a mixture is produced containing one or more amines together with unconverted alcohol and water. Thus, by the amination of isopropanol, a mixture is obtained which comprises principally mono-iso-propylamine, di-iso-propylamine, isopropanol and water. Substantial amounts of mono-iso-propylamines, which boils at 34° C., may be removed in a substantially pure state by a simple fractional distillation. The separation by distillation of the mixture, after the mono-iso-propylamine has been removed, is difficult since the following azeotropes are formed:

Di-iso-propylamine-water, boiling point 72.4° C.
Di-isopropylamine-isopropanol, boiling point 79° C.
Water-isopropanol, boiling point 80.2° C.

It has already been proposed to separate mixtures comprising di-isopropylamine and isopropanol by deliberately adding water and an organic entrainer, for example, an ether or a hydrocarbon of suitable boiling point, and subsequently distilling the mixture in a manner such that there is obtained a residue comprising di-isopropylamine and water. Thus the final stage in processes of this type is the separation of di-isopropylamine and water, and this separation is rendered difficult by azeotrope formation. It has been proposed to employ a chemical dehydrating agent, such as sodium hydroxide, or a method involving decantation at a temperature in excess of room temperature.

In distillation processes of the type described in the preceding paragraph, there is produced a ternary azeotrope comprising water, isopropanol and entrainer. If the boiling point of the entrainer is sufficiently below that of di-isopropylamine to permit these two substances to be separated by distillation, the ternary azeotrope will contain only a minor amount of water and isopropanol. On condensation, the ternary azeotrope separates into two layers, an upper layer, rich in entrainer, and a lower layer, rich in water. The difference in concentration of isopropanol in the two layers depends on the entrainer, and on the temperature. At room temperature the aqueous layer has the higher isopropanol concentration, but since the aqueous layer forms only a small proportion of the condensed azeotrope, the greater amount of isopropanol is present in the upper layer. It has been suggested to free the mixture from isopropanol by removing the lower layer and returning the upper layer to the still, but this process has the disadvantages of recirculating the bulk of the isopropanol to the still, and of removing the isopropanol from the still in the form of an azeotrope containing a relatively minor amount of this substance, which result in the process being laborious, and wasteful in heat utilisation.

As an alternative, it has been proposed to remove the upper layer, and to return the lower aqueous layer to the still, but this process has the disadvantages caused by the small amount of isopropanol present in the ternary azeotrope, and wasteful heat expenditure due to recirculating the water removed.

By selecting an entrainer having a boiling point similar to that of di-isopropylamine, it is possible to remove by distillation a ternary azeotrope containing an enhanced proportion of water and isopropanol, and, by operating in this manner, the aqueous layer of condensed distillate will contain a higher proportion of isopropanol. This process, however, has the disadvantage of involving a difficult separation of di-isopropylamine from residual entrainer.

It has also been proposed to employ an entrainer which boils at a temperature sufficiently above that of di-isopropylamine to permit separation of these substances by distillation, and which forms with water an azeotrope boiling at a temperature below that of the di-isopropylamine-water azeotrope. In this case, the entrainer-water-isopropanol azeotrope gives on condensation an aqueous layer rich in isopropanol. However, the distillate in this process is in general heavily contaminated with di-isopropylamine, and this high loss of required product is uneconomic.

In contradistinction to the processes described above, the process of the present invention does not involve the deliberate addition of water, gives an efficient removal in turn of the water and isopropanol present in the mixture thereby removing the necessity of finally separating water from di-isopropylamine, admits of ready separation between excess entrainer and di-isopropylamine, and does not result in wastage of the latter. Furthermore, by not involving the removal of a considerable amount of water, and by removing water and isopropanol in the form of azeotropes relatively rich in these substances, the process is economical from the standpoints of heat utilisation and size of plant or time of operation necessary to treat a given amount of isopropanol amination product.

According to the present invention, there is provided a process for producing concentrates of di-isopropylamine from admixture with water and isopropanol, which comprises the steps of distilling the mixture in the presence of a hydrocarbon or hydrocarbon fraction, said hydrocarbon or hydrocarbon fraction being free from olefinic or acetylenic unsaturation and boiling within the range of 68° C. to 75° C., and, after the removal of the water content of the mixture in the form of a hydrocarbon-isopropanol-water ternary azeotrope, continuing the distillation in the presence of hydrocarbon or hydrocarbon fraction.

The use in the distillation process of a hydrocarbon or hydrocarbon fraction boiling within the range of 68° to 75° C. results in the formation of hydrocarbon-isopropanol-water ternary azeotrope, and this enables the water to be removed from the mixture as a first stage in the separation. It is desirable to pass the condensed azeotrope to a decanter in which it is maintained at an elevated temperature of 40° to 50° C. In this way, two layers are formed, an upper one comprising the hydrocarbon and the major proportion of the isopropanol, this layer being preferably recirculated to the still, and a lower one comprising water and the minor proportion of isopropanol. It should be noted that by operating the decanter at an elevated temperature, a lower aqueous layer may be obtained which contains a very small amount of isopropanol, for example, less than 5% by weight. In consequence, this layer may be discarded without serious loss of isopropanol. On the contrary, by operating the decanter at room temperature, serious isopropanol losses may result.

In the next stage of the separation, isopropanol is removed as an azeotrope with the hydrocarbon. It should be noted that the hydrocarbon employed in this step may be added initially, or after the removal of the hydrocarbon-isopropanol-water azeotrope, or it may be provided by recirculation from the decanter employed in the first step. Of these possible methods, that employing recirculation is preferred. The hydrocarbon-isopropanol azeotrope contains a higher percentage of isopropanol than does the hydrocarbon-isopropanol-water azeotrope, and in consequence this method of separation is preferable to that employed in the prior art processes which remove the isopropanol in the form of the ternary azeotrope. For example, when n-hexane is employed as the azeotrope-former, the ternary azeotrope contains only 7% by weight of isopropanol, whereas the binary n-hexane-isopropanol azeotrope contains 18% by weight isopropanol.

The amount of hydrocarbon employed should preferably be in excess of that required for the removal of the whole of the isopropanol, and in this case, the excess of hydrocarbon may be removed in the next stage of the distillation, the difference in boiling points between the hydrocarbon and the di-isopropylamine enabling this to be done without difficulty.

Hydrocarbons for use in the process of the present invention include methyl cyclopentane (B. Pt. 71.8° C.) and n-hexane (B. Pt. 68.75° C.). It is also possible to employ a hydrocarbon fraction boiling within the range of 68° to 75° C., the term "hydrocarbon fraction" being used in this specification to designate a mixture of hydrocarbons. A fraction of this type may be obtained, for example, by the destructive hydrogenation of a creosote oil produced by the distillation of high temperature tar, and boiling within the range of 200° to 350° C. The product is then fractionated, and the fraction distilling between 68° and 75° C. washed with sulphuric acid and water, and subsequently dried. In this way, the fraction is freed from aromatic and unsaturated hydrocarbons. A hydrocarbon fraction produced in this manner was analysed and found to contain 84% by weight of methyl cyclopentane and 11% by weight of n-hexane, the remaining 5% being unidentified cycloparaffins.

The volume of hydrocarbon or hydrocarbon fraction employed in the process of the present invention is preferably four to six volumes per volume of isopropanol present in the mixture.

When, for example, methyl cyclopentane is used in the process, the first fraction is a ternary azeotrope containing approximately 86% by weight methyl cyclopentane, 9% by weight isopropanol, and 5% by weight water, and boiling at 58.7° C. On condensation, this azeotrope is heterogeneous and separates into two layers. By carrying out this separation at 45° C., a lower aqueous layer is obtained containing 92% by weight of water and 8% by weight of isopropanol. This layer may be discarded and the upper layer, comprising methyl cyclopentane and isopropanol, returned to the still.

On continuing the distillation, a methyl cyclopentane-isopropanol azeotrope distills over at a temperature of 63.8° C. This azeotrope on condensation is homogeneous, and contains 21% by weight of isopropanol. The methyl cyclopentane may be recovered from this azeotrope by washing with water in counter-current flow. Alternatively, a separation may be effected by azeotropic distillation in the presence of water, by the process described above, except that in this case it is desirable to operate the decanter at a temperature not exceeding room temperature. This simple recovery of the hydrocarbon is an important feature of the process of the present invention.

The mixture, after the removal of water and isopropanol as azeotropes of these with the methyl cyclopentane, will then contain di-isopropylamine and any excess of methyl cyclopentane over that required for the formation of azeotropes. These two substances may be separated by a simple distillation.

The process of the present invention is most conveniently carried out in a batchwise manner but a continuous process may be employed.

It will be understood that the boiling points of the azeotropes will depend upon the hydrocarbon employed, or, if a fraction boiling at 68° C. to 75° C. is employed, upon the composition of the fraction, but these variations are only slight and do not affect the general principle of the invention.

In the examples given below, it is to be understood, unless stated to the contrary, that in the distillations, a reflux ratio of 20:1 was employed, and that the analyses are expressed as percentages by volume.

Example 1

A mixture having the following composition by volume was obtained by the amination of iso-propanol:

| | Percent |
|---|---|
| Mono-isopropylamine | 50.5 |
| Di-iso-propylamine | 16.5 |
| Iso-propanol | 12.5 |
| Water | 20.1 |

In the first fractionation process, 10 litres of this liquid were fractionated in a column having a performance equivalent to 30 theoretical plates. The following fractions were obtained:

| Fraction | Temp., °C. | Volume, lts. | Composition |
|---|---|---|---|
| 1 | 31–34 | 4.94 | 99% mono-iso-propylamine. |
| 2 | 34–77.5 | 1.76 | 85.7% di-iso-propylamine. 6.3% water. 5.5% iso-propanol. 2.5% mono-iso-propylamine. |
| 3 | 77.5–100 | 1.50 | 75.0% iso-propanol. 15.9% water. 9.1% di-iso-propylamine. |
| Residue | | 1.65 | 99% water. |

It is evident from this table that Fraction 1 was substantially pure mono-iso-propylamine. Fraction 3, which contained a major proportion of unchanged iso-propanol was returned to the amination step.

The first fractionation process was repeated, using a further portion of 10 litres of liquid. The fraction distilled within the range of 34 to 77.5° C. was bulked with the corresponding Fraction 2 already obtained. The bulked Fraction 2, 90% of which had been collected in the temperature range 70° C.–77.5° C. was separated into its constitutents by distillation in the presence of a hydrocarbon fraction boiling in the temperature range of 70° C.–75° C.

A hydrocarbon fraction was obtained by the destructive catalytic hydrogenation of a creosote oil, produced by the distillation of high temperature tar, and boiling within the range of 200° to 350° C. The product was distilled using a reflux ratio of 50:1 and a distillation column having a performance equivalent to 80 to 100 theoretical plates. The fraction boiling in the range 70° C.–75° C. was allowed to stand for five days over concentrated sulphuric acid. It was washed with dilute sodium hydroxide, and then with water, dried and redistilled.

500 mls. of this hydrocarbon fraction were added to two litres of Fraction 2 from the first fractionation process, and the mixture distilled, using a column having a performance equivalent to 30 theoretical plates. The first fraction, boiling within the range 39° C.–58.7° C. had a volume of 60 mls. and contained 85% by volume of mono-isopropylamine. This fraction was returned to the first fractionation process.

The second fraction, boiling within the range 59° C.–61° C., consisted principally of the water-hydrocarbon azeotrope. This fraction was passed to a decanter maintained at 40° C. The upper layer from the decanter, comprising substantially pure hydrocarbon, was returned to the process, and the lower layer, having a volume of 119 mls. and containing 91% water, 8% isopropanol and less than 0.2% di-isopropylamine, was removed.

On further fraction of the mixture after the removal of these two fractions, the following fractions were obtained:

| Fraction | Temp., °C. | Volume, mls. | Composition |
|---|---|---|---|
| A | 65–65.5 | 436 | 79% hydrocarbon. 21% isopropanol. |
| B | 69.5–75.5 | 160 | 100% hydrocarbons. |
| C | 75.5–84.0 | 25 | 50% di-iso-propylamine. 50% hydrocarbon. |
| D | 84.0–84.2 | 1,600 | 100% di-iso-propylamine. |
| Residue | | 80 | 90% di-iso-propylamine. |

Fraction A was separated into its constituents by the addition of 264 mls. of water. The mixture was distilled using a fractionating column having a performance equivalent to 25 theoretical plates. The distillate was passed to a decanter, from which 10% of the upper layer was removed, the remainder of the liquid in the decanter being returned to the fractionating column. In this way, with a head temperature of 59° C. to 61° C., 320 mls. of 97.5% pure hydrocarbon, containing less than 1.3% isopropanol, were obtained. This fraction, together with Fraction B from the previous fractionation, represents a 95% recovery of the hydrocarbon employed.

Example 2

One litre of Fraction 2 from the first distillation process employed in Example 1 was distilled in a laboratory fractionating still having a performance equivalent to 70 theoretical plates with 250 mls. of pure methylcyclopentane. The following fractions were obtained:

| Fraction | Conditions | Temp., °C. | Volume, mls. | Composition, percent by volume |
|---|---|---|---|---|
| A | Reflux ratio 30:1 | 37.0–58.7 | 31.0 | 82.7% monoisopropylamine. |
| B | Decanter at 45° C.; lower layer removed; upper layer returned to still. | 58.7–58.9 | 64.5 | Lower layer comprised: 91.6% water; 0.2% di-iso-propylamine; 8.2% iso-propanol. |
| C | Reflux ratio 40:1 | 58.9–64.0 | 250.0 | 20.8% isopropanol; 79.2% methyl cyclopentane. |
| D | do | 71–72 | 49.6 | 98% methyl cyclopentane. |
| E | do | 72–84 | 10.0 | 20% methyl cyclopentane; 80% di-isopropylamine. |
| F | do | 84–84.4 | 800 | 99.7% di-isopropylamine. |
| Residue | | | 40 | 93% di-isopropylamine. |

This example shows that from 1 litre of Fraction 2, containing 857 mls. of di-isopropylamine, 800 mls. of a substantially pure sample of this compound were obtained.

Example 3

500 mls. of Fraction 2 obtained in Example 1 were distilled in a laboratory fractionation column having a performance equivalent to 50 theoretical plates with 150 mls. of pure n-hexane. The following major fractions were obtained:

| Fraction | Conditions of operation | Temp., °C. | Volume, mls. | Composition, percent by volume |
|---|---|---|---|---|
| A | Reflux ratio of 30:1 | 37–58.2 | 15.6 | 81.1% mono-isopropylamine. |
| B | Decanter at 50° C.; lower layer removed; upper layer returned to still. | 58.2–58.4 | 31.7 | 95.4% water; 0.15% di-isopropylamine; 4.45% iso-propanol. |
| C | Reflux ratio of 40:1 | 58.4–62.8 | 145 | 18% isopropanol; 82% n-hexane. |
| D | do | 68.5–69.0 | 30 | 100% n-hexane. |
| E | do | 84–84.4 | 400 | 99.7% di-isopropylamine. |
| Residue | | | 18.6 | 94% di-isopropylamine. |

This example shows that 500 mls. of Fraction 2 containing 428.5 mls. of di-isopropylamine, 400 mls. of a substantially pure sample of di-isopropylamine were obtained.

I claim:

1. A process for separating diisopropylamine from a mixture containing diisopropylamine, isopropanol and water, which comprises adding to said mixture a saturated hydrocarbon material boiling in the range of 68° to 75° C., said saturated hydrocarbon material comprising a member of the group consisting of methyl cyclopentane and n-hexane, distilling the resulting mixture, said amine remaining as bottoms, the water being separated therefrom by the formation of the hydrocarbon-water-isopropanol azeotrope, the said azeotrope being then condensed and passed to a decanter wherein it separates into an upper hydrocarbon-rich layer and a lower water-rich layer, the lower layer being removed by decantation and the upper layer being returned to the still where distillation in the presence of the hydrocarbon is continued until substantially all water is removed.

2. A process as claimed in claim 1 in which the hydrocarbon-isopropanol-water azeotrope is passed to a decanter maintained at a temperature of 40° to 50° C., whereby two layers are formed, the upper one comprising hydrocarbon and a major proportion of the isopropanol and the lower one comprising water and a minor proportion of the isopropanol, the lower layer being discarded and the upper layer returned to the still.

3. A process as claimed in claim 1 wherein the distillation of the mixture remaining after removal of said ternary azeotrope is continued in the presence of the hydrocarbon thereby separating the isopropanol contained in the said mixture from the said amine by forming a hydrocarbon-isopropanol azeotrope, removing said azeotrope and separating the remaining hydrocarbon-di-isopropylamine mixture by a simple distillation.

4. The process of claim 1, wherein the hydrocarbon material is n-hexane.

5. The process of claim 1, wherein the hydrocarbon material is methyl cyclopentane.

6. The process of claim 1, wherein after the removal of the hydrocarbon-isopropanol-water ternary azeotrope the distillation is continued in the presence of 4–6 volumes of the hydrocarbon per volume of isopropanol present in the mixture at this stage.

7. In a process of preparing diisopropylamine by the amination of isopropanol, the steps of separating diisopropylamine from the amination mixture containing the diisopropylamine, isopropanol and water, said steps comprising adding to said mixture a saturated hydrocarbon material boiling in the range of 68° to 75° C., said saturated hydrocarbon material comprising a member of the group consisting of methyl cyclopentane and n-hexane, distilling the resulting mixture, said amine remaining as bottoms, the water being separated therefrom by the formation of the hydrocarbon-water-isopropanol azeotrope, the said azeotrope being then condensed and passed to a decanter, wherein it separates into an upper hydrocarbon-rich layer and a lower water-rich layer, the lower layer being removed by decantation and the upper layer being returned to the still where distillation in the presence of the hydrocarbon is continued, the only water used in the process being that in the aforesaid amination mixture.

References Cited in the file of this patent

UNITED STATES PATENTS

| Number | Name | Date |
|---|---|---|
| 2,348,683 | McKenna | May 9, 1944 |
| 2,512,584 | Smith | June 20, 1950 |
| 2,512,585 | Smith | June 20, 1950 |